(12) United States Patent
Habernegg

(10) Patent No.: US 9,988,113 B2
(45) Date of Patent: Jun. 5, 2018

(54) HEAVY-LOAD MODULAR VEHICLE

(71) Applicant: J.G.B.D. Consult Sprl, Lummen (BE)

(72) Inventor: Hans-Joerg Habernegg, Kaufbeuren (DE)

(73) Assignee: J.G.B.D. Consult Sprl, Lummen (BE)

( * ) Notice: Subject to any disclaimer, the term of this patent is extended or adjusted under 35 U.S.C. 154(b) by 0 days. days.

(21) Appl. No.: 15/099,798

(22) Filed: Apr. 15, 2016

(65) Prior Publication Data

US 2016/0257361 A1 Sep. 8, 2016

Related U.S. Application Data

(63) Continuation of application No. PCT/EP2014/056598, filed on Apr. 2, 2014.

(30) Foreign Application Priority Data

Oct. 18, 2013 (DE) .................... 20 2013 104 703 U

(51) Int. Cl.
  *B62D 53/06* (2006.01)
  *B62D 63/06* (2006.01)
  (Continued)

(52) U.S. Cl.
  CPC .............. *B62D 63/061* (2013.01); *B60P 1/00* (2013.01); *B60P 3/40* (2013.01); *B62D 21/14* (2013.01);
  (Continued)

(58) Field of Classification Search
  CPC ...... B62D 63/061; B62D 21/14; B62D 21/20; B62D 61/10; B62D 63/068; B62D 53/04; B60P 1/00; B60P 3/40
  See application file for complete search history.

(56) References Cited

U.S. PATENT DOCUMENTS

| 2,119,800 A | * | 6/1938 | Tull | ......................... B60P 3/40 |
| | | | | 280/423.1 |
| 2,741,489 A | * | 4/1956 | Bigge | ....................... B60P 3/40 |
| | | | | 280/407.1 |

(Continued)

FOREIGN PATENT DOCUMENTS

| DE | 1 555 578 A1 | 11/1969 |
| DE | 25 54 047 A1 | 6/1977 |

(Continued)

OTHER PUBLICATIONS

Office Action dated May 25, 2016 in European Patent Application No. 14714709.4-1755 and letter dated Aug. 24, 2016 in response, with English translation of relevant part.

(Continued)

*Primary Examiner* — Jacob B Meyer
(74) *Attorney, Agent, or Firm* — Collard & Roe, P.C.

(57) ABSTRACT

A heavy-load modular vehicle having at least one axle, one steering, and coupling device not only can be coupled with at least one further heavy-load module and/or further transport apparatuses, but optionally also can be pulled out, particularly also telescoped. It has a central longitudinal support having at least one open face side, in which a pull-out support is guided. The metal cover sheet of the loading surface can take on the function of the upper belt of the central longitudinal support and leads to a self-supporting construction. A box-shaped lower belt counteracts twisting or torsions of the vehicle frame in the case of a trough-shaped design. A universal coupling head, particularly a bolt/tab coupling, makes it possible to couple on heavy-load modules having a different width, different tires and/or a different height, without an additional adapter.

16 Claims, 21 Drawing Sheets

(51) Int. Cl.
*B60P 3/40* (2006.01)
*B62D 21/14* (2006.01)
*B62D 21/20* (2006.01)
*B62D 53/04* (2006.01)
*B62D 61/10* (2006.01)
*B60P 1/00* (2006.01)

(52) U.S. Cl.
CPC .............. *B62D 21/20* (2013.01); *B62D 53/04* (2013.01); *B62D 61/10* (2013.01); *B62D 63/068* (2013.01)

(56) References Cited

U.S. PATENT DOCUMENTS

| | | | | |
|---|---|---|---|---|
| 2,900,198 A * | 8/1959 | Patton | B60P 3/40 | 280/404 |
| 3,134,607 A * | 5/1964 | Doll | B62D 63/061 | 280/124.113 |
| 3,685,853 A * | 8/1972 | Goldsmith | B60P 3/16 | 280/124.115 |
| 3,697,098 A * | 10/1972 | Fisher | B62D 21/14 | 280/404 |
| 3,865,206 A * | 2/1975 | Coval | B62D 13/04 | 180/24 |
| 3,913,933 A * | 10/1975 | Visser | B60P 3/40 | 280/656 |
| 3,977,691 A * | 8/1976 | Robertson | B60P 3/40 | 280/404 |
| 3,979,133 A * | 9/1976 | Morris | B62D 21/14 | 280/42 |
| 4,196,918 A * | 4/1980 | Strader | B62D 21/14 | 267/41 |
| 4,262,923 A * | 4/1981 | Weir | B62D 53/068 | 280/404 |
| 4,397,476 A * | 8/1983 | Bolyard | B62D 63/061 | 280/149.2 |
| 4,441,730 A * | 4/1984 | Damm | B62D 13/04 | 280/426 |
| 4,877,293 A * | 10/1989 | French | B60P 1/6418 | 280/405.1 |
| 4,943,078 A * | 7/1990 | McGhie | B60G 21/06 | 280/405.1 |
| 5,042,831 A * | 8/1991 | Kuhns | B62D 21/14 | 280/404 |
| 5,163,698 A * | 11/1992 | Evens | B60P 3/41 | 280/401 |
| 5,332,276 A * | 7/1994 | Blodgett, Jr. | B60P 3/34 | 296/171 |
| 5,375,866 A * | 12/1994 | Wagner | B62D 53/068 | 280/405.1 |
| 5,630,604 A * | 5/1997 | Ducote | B62D 13/02 | 280/426 |
| 5,630,694 A * | 5/1997 | Ihara | B64F 1/32 | 244/137.1 |
| 5,685,554 A * | 11/1997 | Poxleitner | B60D 1/167 | 280/491.2 |
| 5,794,960 A * | 8/1998 | Sill | B62D 53/061 | 280/425.2 |
| 6,024,184 A * | 2/2000 | Kalkman | B62D 61/10 | 180/14.1 |
| 6,199,894 B1 * | 3/2001 | Anderson | B62D 21/12 | 180/209 |
| 6,231,065 B1 * | 5/2001 | Brown | B60D 1/155 | 180/7.1 |
| 6,428,035 B1 * | 8/2002 | Maxwell | B60P 3/122 | 280/656 |
| 6,467,223 B1 * | 10/2002 | Christley | E04B 5/04 | 52/143 |
| 6,511,092 B1 * | 1/2003 | Chepa | B60Q 1/305 | 280/408 |
| 6,969,104 B2 * | 11/2005 | Green | B60P 1/6481 | 280/656 |
| 7,134,829 B2 * | 11/2006 | Quenzi | B60P 1/02 | 414/482 |
| 7,144,211 B2 * | 12/2006 | Abel | B60P 3/40 | 410/77 |
| 7,204,665 B2 * | 4/2007 | Heuvel | B60P 3/00 | 410/44 |
| 7,802,958 B2 * | 9/2010 | Garcia | B60P 1/52 | 414/482 |
| 7,950,675 B1 * | 5/2011 | Quenzi | B60G 17/02 | 180/209 |
| 8,191,957 B2 * | 6/2012 | Gosselin | B62D 21/14 | 280/785 |
| 8,371,599 B2 * | 2/2013 | Duvall | B60D 1/01 | 280/402 |
| 8,657,323 B2 * | 2/2014 | Pedersen | B60P 3/06 | 280/404 |
| 9,096,263 B2 * | 8/2015 | Prem | B62D 13/005 | |
| 9,187,123 B2 * | 11/2015 | Sutton | B60G 3/06 | |
| 9,302,708 B2 * | 4/2016 | Ingels | B62D 21/14 | |
| 9,481,218 B2 * | 11/2016 | Harvey | B60D 1/481 | |
| 9,522,707 B2 * | 12/2016 | Kern | B60G 7/02 | |
| 9,527,539 B1 * | 12/2016 | Hellbusch | B62D 63/061 | |
| 9,849,927 B2 * | 12/2017 | Haefele | B62D 63/061 | |
| 2006/0181063 A1 * | 8/2006 | Eddings | B62D 21/14 | 280/656 |
| 2006/0284397 A1 * | 12/2006 | Lambert | B62D 21/14 | 280/491.1 |
| 2007/0132208 A1 * | 6/2007 | Winter | B62D 63/061 | 280/656 |
| 2010/0109309 A1 * | 5/2010 | Kootstra | B62D 21/04 | 280/786 |
| 2013/0038043 A1 * | 2/2013 | Brown | B60S 9/10 | 280/656 |
| 2015/0054256 A1 * | 2/2015 | Graham | B62D 53/061 | 280/441.2 |
| 2016/0137238 A1 * | 5/2016 | Faymonville | B60P 3/40 | 280/423.1 |
| 2016/0257361 A1 * | 9/2016 | Habernegg | B60P 3/40 | |
| 2016/0311470 A1 * | 10/2016 | Smith | B62D 53/068 | |
| 2017/0050692 A1 * | 2/2017 | Haefele | B62D 63/025 | |
| 2017/0106926 A1 * | 4/2017 | Habernegg | B62D 63/061 | |
| 2017/0129539 A1 * | 5/2017 | Kramer | B62D 21/14 | |

FOREIGN PATENT DOCUMENTS

| | | |
|---|---|---|
| DE | 10 2010 014 590 A1 | 10/2011 |
| EP | 0 526 368 A1 | 2/1993 |
| EP | 1 621 450 A2 | 2/2006 |
| EP | 2457 767 A1 | 5/2012 |
| NL | 9400578 A | 11/1995 |

OTHER PUBLICATIONS

International Search Report of PCT/EP2014/056598, dated Aug. 20, 2014.
Heavy-duty modular vehicles (transport modules)—Faymonville MODULMAX, http://www.faymonville.com/ vehicles.aspx?id=330&lang=en, pp. 1-3, downloaded Oct. 23, 2017.
Low loader system for heavy transport—Faymonville COMBIMAS, http://www.faymonville.com/ vehicles.aspx?d=670&lang=en, pp. 1-3, downloaded Oct. 23, 2017.
Goldhofer AG, Heavy-duty modules, http://www.goldhofer.de/ en/heavy-duty-modules.15.html, pp. 1-6, downloaded Oct. 23, 2017.
Modular Vehicles for Road Transportation—SCHEURLE, https://www.scheuerle.com/products/ modular-vehicles-for-road-transportation.html, pp. 1-2, downloaded Oct. 23, 2017.

* cited by examiner

HEAVY-LOAD MODULAR VEHICLE

CROSS REFERENCE TO RELATED APPLICATIONS

This application is a continuation of and Applicant claims priority under 35 U.S.C. § 120 of International Application No. PCT/EP2014/056598 filed on Apr. 2, 2014, which claims priority under 35 U.S.C. 119 of German Application No. 20 2013 104 703.1 filed on Oct. 18, 2013. The international application under PCT article 21(2) was not published in English. The disclosures of the aforesaid International Application and German application are incorporated by reference.

BACKGROUND OF THE INVENTION

1. Field of the Invention

The invention relates to a heavy-load modular vehicle having at least one axle, one steering, and coupling means.

2. Description of the Related Art

Modular vehicles of the stated type are used to transport large loads, particularly also heavy loads. The modular structure of the modular vehicle allows individual adaptation to the dimension and weight of the goods to be transported. Heavy-load vehicles composed of multiple vehicles are known and are used for transport of heavier and/or longer loads. In this regard, the load lies on the vehicle modules themselves or on load supports, such as, for example on low-loader decks, flat-bed decks or excavator decks, or on long-material trailers.

Also known are adapters, goosenecks, drawbars and the like which all can be coupled with heavy-load modules. Each module has one or more axle lines, which are equipped with a corresponding number of wheels. Both single tires and double tires are usual. Furthermore, each module has at least one coupling, for example a comb coupling, by way of which it can be releasably connected with a further module, particularly by using a bolt that can be inserted through the fittings. Such a bolt/tab coupling makes it consistently possible to connect and combine as many modules with one another as required for the corresponding transport task. After transport has been carried out and the load has been unloaded, modules that are not needed can be loaded onto the remaining modules and driven back to the nearest loading station or shipping yard, without stress on them.

In part, there is also a need to save axle lines during a transport particularly if the load material is very long but not particularly heavy. It is increasingly necessary to avoid empty runs and to be able to react quickly to different load sizes, for example during a back and forth trip or a rally. Also, long heavy-load transporters can be very difficult to maneuver.

SUMMARY OF THE INVENTION

This task is accomplished, according to the invention, in that the heavy-load module can be coupled not just with at least one further heavy-load module and/or further transport apparatuses, but optionally can also be extended. In particular, it can be structured so that it can optionally be telescoped once or multiple times. In this way the heavy-load modular vehicle becomes variable in length and can adapt to different load lengths, without unnecessary axle lines being used and having to be carried along.

Telescoping ability is advantageously made possible in that the heavy-load modular vehicle has a central load support having at least one open face side. In this way, at least one pull-out support can be guided in the central longitudinal support, which, at the same time, is freed of all the disruptive installations known in the state of the art, such as steering cylinders, compressed air containers and the like. In an embodiment this support can also be made to telescope multiple times, by having multiple pull-out supports guided within one another, so that they can be pulled out. Up to the present, such telescoping ability has failed due to lack of construction space in conventional vehicle frames, particularly in the longitudinal support. The invention also proposes a heavy-load modular vehicle, in which the metal cover sheet of the loading surface, which is structured as a shell construction, takes on the function of the upper belt of the central longitudinal support. This metal cover sheet thereby represents the upper belt, i.e. the counter-belt to the lower belt, and leads to a self-supporting construction. At the same time, the central longitudinal support can have a box-shaped lower belt that serves as a torsion tube, which belt counteracts twisting or torsion of the vehicle frame particularly in the case of a trough-shaped design.

The longitudinal support itself can also be configured in box shape. In contrast a trough-shaped design can be achieved, in particular, in that the heavy-load modular vehicle has a U-shaped longitudinal support that is open at the top. This U-shaped longitudinal support in turn can be formed from a box-shaped lower belt serving as a torsion tube, having two crosspieces bent toward the outside, in each instance, to form the metal cover sheets of a self-supporting structure. In the case of such an embodiment, the perpendicular crosspieces and the metal cover sheet can be structured as an edge construction, if necessary wherein then the metal cover sheet that forms the upper belt has the same thickness as the crosspieces. This arrangement allows further savings in material and weight. The heavy-load vehicle has a lower inherent weight, at the same payload. In this way long transports on public roads, in particular, can be carried out more efficiently.

This efficiency applies in the case, for example, of pipeline elements, off-shore constructions, drilling platforms, wind power systems, platforms, and pipelines, but also in the case of components such as steel and concrete elements, and crane systems such as cranes, crane weights, and crane components. The same holds true for bulky goods, long material, and bridge elements. The modules can be coupled with all other available additional components and accessories such as low-bed adapters, goosenecks, and drawbars. In this way, all types of special trailers can be formed, as needed. By the bending of the crosspieces, it is possible to do without unnecessary or disadvantageous heat introduction into the construction by means of welding on metal cover sheets or loading surface elements.

By means of doing without the conventional upper belt, a longitudinal trough can be made available at the same time, into which trough excavator booms and posts or other components that would otherwise project upward and impair or prevent travel under bridges and the like, for example, can be laid down or lowered.

The trough in turn can have an open face side, at least on one side, in which a pull-out support, which can also be pulled out multiple times, if applicable, can be disposed, in order to make available the required extension of the heavy-load modular vehicle, while simultaneously doing without non-required axle lines. The self-supporting structure absorbs the tensile forces, pressure forces, and transverse forces that occur, similar to a known self-supporting car body, and prevents undesirable or impermissible torsion. In this way, it is possible to do without a usual frame or a conventional chassis, in other words, in particular, a ladder frame or tubular frame. Instead, the overall structure takes on the supporting function. There is no separation between components subject purely to bending/torsion or shear, and further components that serve to accommodate the load (such as, for example, ladder frame or lattice frame). All the parts act statically as a rib structure or as shells, and absorb the forces that are introduced, in their totality.

Using such a self-supporting construction, a significantly lighter and more inexpensive method of construction is obtained, turning away from the non-self-supporting frame structure or chassis structure that has been usual for trucks up to the present. The required rigidity is achieved by means of suitable measures. As a result, elastic deformations are kept low, and undesirable creaking noises during travel operation are avoided.

This great rigidity simultaneously has positive effects on the driving behavior, particularly on bad roads or in extreme situations. These positive effects particularly hold true, but not only, for transports on public roads, on which travel also takes place at higher speeds, such as, in particular, also long-material transports, as well as for transports within a facility and off-road transports, some with a very great payload.

Every heavy-load modular vehicle can be displaced on a central pull-out support, according to the overall concept of the invention, and locked in place. The modules can be more or less threaded on or lined up as needed, no matter whether they are single-axle or multi-axle modules. Up to six-axle modules are provided.

Heavy-load modular vehicles having a U-shaped load support open at the top can be set onto the central pull-out support, from below, independent of other modules that have already been threaded on, and can be removed from it again, as well. This placement is done in that the support is raised, by way of suitable lifting apparatuses, for example pneumatic, hydraulic or electrical apparatuses so that the module that is not needed can be pulled out to the side, for example using a forklift or the like.

In the reverse order, additional modules can also be inserted. These additional modules are then pushed to the required location and can be locked in place there, for example by means of hydraulically activated bolts and other locking mechanisms.

According to the invention, the heavy-load modular vehicles have a coupling head or another suitable coupling means, at least on one side. These coupling devices are disposed, according to the invention, below or outside of the open face side of the longitudinal support. This arrangement is necessary in order to be able to pull the pull-out support out of the longitudinal supports and insert it into them. In the case of conventional heavy-load modular vehicles, the coupling means, particularly coupling heads, which can particularly be configured as a bolt/tab coupling, were welded onto the closed face side of the longitudinal supports. In this state of the art, fundamentally no ability existed to pull out the individual modules.

The present invention changes this fundamentally, in that it makes it possible not only to combine the heavy-load vehicle frames by means of the coupling heads and coupling means, but also to pull them out. In particular, the coupling head can be configured as a bolt/tab coupling, which makes available a very stable type of connection, for example as a comb coupling. The bolt/tab coupling can transfer both opening bending moments and closing bending moments in interaction with additional pressure pieces and/or tie rods. If a transport load is applied centered between two modules connected with one another by means of the coupling means, very great bending forces are exerted on this compound structure, with the result that the compound structure bends in the region of the coupling, and the two opposite free ends of the modules bend up. This result is prevented with the help of the pressure pieces. Vice versa, point-type weight stress of the modules at their free ends would lead to upward bending of the connection region between the two modules. This result is prevented by means of corresponding tie rods.

As the result of opening of the face side, the risk exists that the longitudinal supports, which are open on the face side, are no longer as stable and connection-rigid as before. This risk is counteracted by means of the use of at least one tie beam. In the case of U-shaped longitudinal supports that are open at the top, at least one corresponding clamp or a U-shaped brace is provided. Not only the U-shaped brace or the ring beam, but also the clamp can be combined with the coupling head or with the coupling means, in order to save weight and construction space.

In a further embodiment, it is provided that the heavy-load modular vehicle has a front and a rear overhang, wherein the distance between the center of the coupling head or coupling means corresponds to half the wheelbase up to the next axle. This arrangement has the result that the track rods that connect the steering of two adjacent heavy-load modular vehicles have the same length as that within a heavy-load modular vehicle. Within the individual vehicle modules, repositionable track rods are already present for uniform steering of the individual vehicle axles. The invention expands this feature by the ability to combine the chassis and, in particular, their steering. If two modules are connected with one another, then the wheel base between their chassis is also identical to that within a single chassis or module.

The steering is completely adjustable. For example, the axles situated at the beginning and at the end of a heavy-load modular vehicle combination can be turned at a much greater angle for example of 60°, while the angle constantly decreases toward the center of the combination, until the axle situated precisely in the middle has no steering turn at all any more. The steering angles increase from the center toward the outside, in the opposite direction. The combination can therefore be moved in a very tight turning circle, with simultaneously minimized tire wear. For very wide loads, at least two heavy-load modular vehicles can also be connected with one another in the transverse direction, by means of suitable brackets. For this purpose sufficiently wide spacer pieces are used, in order not to hinder or damage the tires and rims, which project outward in the case of a corresponding steering turn.

The respective heavy-load modular vehicle can optionally, in whole or in part, contain installation parts for a steering that can be fully combined. Along with the track rods already mentioned and the steering actuators, such installation parts are, for example, what are called slave cylinders, which convert the hydraulic control pressures transferred by a corresponding master cylinder into corresponding steering movements. Optionally such installation parts can be provided only for the modules installed at the very front or at the very back in a module combination, because the other modules, located centrally, are co-steered by way of the track rods. In this way, once again, weight and costs can be saved. In this case, attention must be paid, when assembling the module combinations, to ensure that a module that contains a fully combinable steering is threaded onto the longitudinal support at the beginning and at the end, in each instance.

Finally, the invention also provides connection means for a corresponding accommodation for a gooseneck for connecting the entire heavy-load module with a tractor unit or the like. For this purpose, once again a bolt/tab coupling is particularly suitable as a coupling means, because the existing bolt/tab coupling of the front module can be coupled with it. The front end of the pull-out support can also be provided with such a coupling head, in order to connect it directly with the gooseneck. Alternatively, a tie rod or tow bar can also be configured so that it can be connected with a heavy-load modular vehicle.

Finally, heavy-load modular vehicles having different tires can also be combined with one another, for example if they have different tire sizes such as 17.5 inches or 19.5 inches. In this case, the coupling means must be disposed in such a manner, in terms of height, that they align with one another in the connection position. The longitudinal vehicle supports must be positioned, in terms of height, in such a manner that both can be connected with one another using an insertable or retractable pull-out support. This arrangement leads to a maximally possible combination variety of the different modules and vehicle components. Then, transport frameworks such as loading decks, low beds, excavator decks, flat-bed decks or low-loader decks can furthermore be installed between the individual heavy-load modules, by using the known coupling elements or those coupling elements according to the invention. Heavy-load modular vehicles having different widths and/or heights can also be combined with one another. Further embodiments are possible, for example as follows:

heavy-load modular vehicle, which is composed of at least two modules, by way of coupling means, wherein each module has at least one steerable axle, characterized in that an accommodation for a longitudinal support, open at least on one side, is provided between the wheels, in the longitudinal vehicle direction, and that each module is provided, at least on the face side, with coupling means for fixation of an adjacent module or other vehicle elements, such as a gooseneck, a deck or the like;

heavy-load modular vehicle, characterized in that the accommodation for the longitudinal support is configured to be box-shaped, or U-shaped in cross-section, wherein the accommodation forms a part of the vehicle frame;

heavy-load modular vehicle, characterized in that the accommodations have a lower belt configured as a torsion tube;

heavy-load modular vehicle, characterized in that the accommodations have a loading surface configured as a shell construction as the upper belt;

heavy-load modular vehicle, characterized in that the modules are fixable in place at different positions on the longitudinal support;

heavy-load modular vehicle, characterized in that the longitudinal support itself is configured so that it can telescope;

heavy-load modular vehicle, characterized in that the coupling means are configured as bolt/tab couplings;

heavy-load modular vehicle, characterized in that the modules are configured so that they can be coupled next to one another and/or one behind the other;

heavy-load modular vehicle, characterized in that a pull-out support is positioned in the longitudinal support, wherein the modules having U-shaped accommodations can be positioned on the longitudinal support or the pull-out support from below;

heavy-load modular vehicle, characterized in that the accommodation that is open on the face side and/or the longitudinal support has a U-shaped or essentially rectangular region, reinforced on the face side;

heavy-load modular vehicle, characterized in that a front and rear overhang of the vehicle frame is provided, wherein the distance between the coupling plane of two adjacent modular vehicles to the nearest axle corresponds to half the wheelbase;

heavy-load modular vehicle, characterized in that the steering linkages of adjacent modular vehicles can be coupled with one another;

heavy-load modular vehicle, characterized in that it has a coupling head, particularly a bolt/tab coupling, which head is connectable with a coupling head, particularly a bolt/tab coupling of a module having a different width, different tires and/or different height, without an additional adapter;

heavy-load modular vehicle, characterized in that pressure pieces, metal system sheets and/or bores stand opposite one another on the heavy-load modular vehicles to be combined, at least in part, and that the tie rods, centering bolts, and coupling bolts that are usual for modules having the same width, the same tires and/or the same height can be used.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENTS

Figure 1:
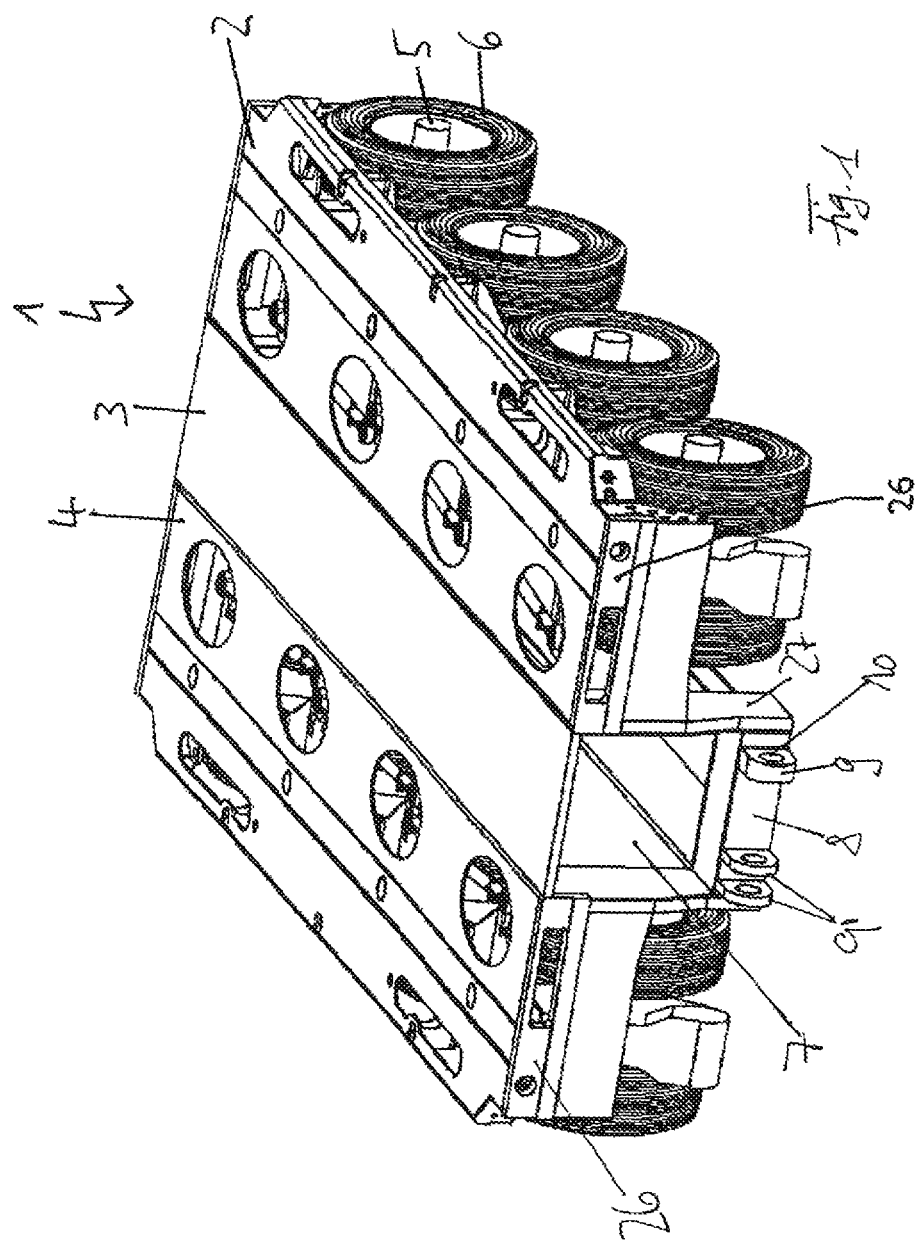
FIG. 1 is a perspective view of a four-axle heavy-load modular vehicle with single tires.
Figure 9:
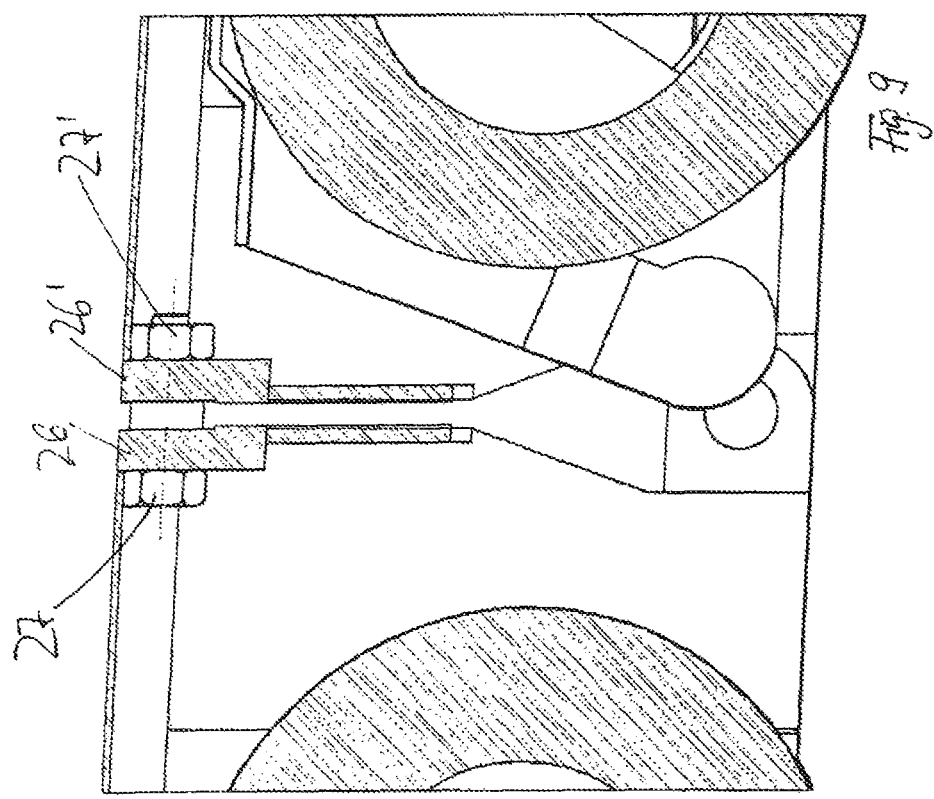
FIG. 9 is a side view of a coupling location.

A heavy-load modular vehicle indicated in general as 1 has a frame 2 with a central, for example a box-shaped longitudinal support 3 and a loading surface 4. Running wheels 6 are attached to axles 5, wherein FIG. 1 shows a four-axle module with twin tires. The longitudinal support 3 has an open face wall (face side) 7. Coupling means 9, 9' are disposed on its box-shaped lower belt 8. For example, these means are configured as tabs having pass-through openings 10, into which a bolt, not shown in greater detail, can be inserted and locked in place for a connection with a corresponding coupling means of a further heavy-load modular vehicle. Further spacer pieces or pressure pieces 26 are disposed on the vehicle frame 2. These pieces interact with corresponding pressure pieces 26', not shown in any detail, of a further adjacent module (FIG. 9), in order to absorb any bending moments that occur. The same holds true for the ring beams or tie rods 27, 27'. Optionally, a pull-out support 11, as is evident, for example, from FIG. 2, can be pulled out of the central longitudinal support 3. The former can have locking bores 12, into which locking bolts, not shown in any detail, which can be activated hydraulically, pneumatically or mechanically, for example, engage, in order to fix the pull-out support 11 in place in the desired pull-out length.

Figure 3:
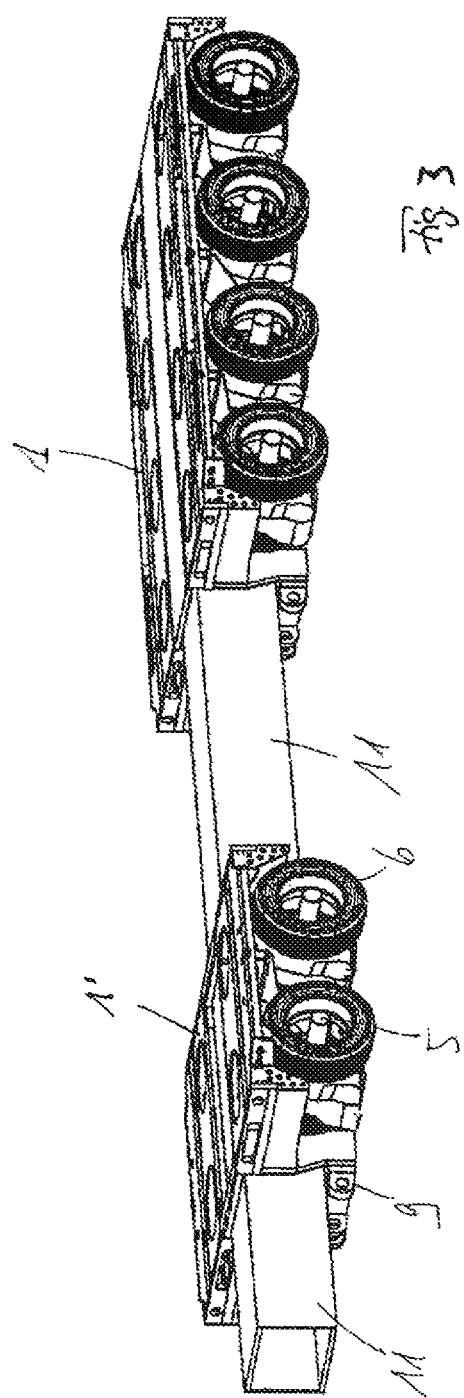
FIG. 3 is a perspective view of a four-axle heavy-load modular vehicle according to FIG. 1 and of a two-axle heavy-load modular vehicle, connected by means of a pull-out support.
Figure 4:
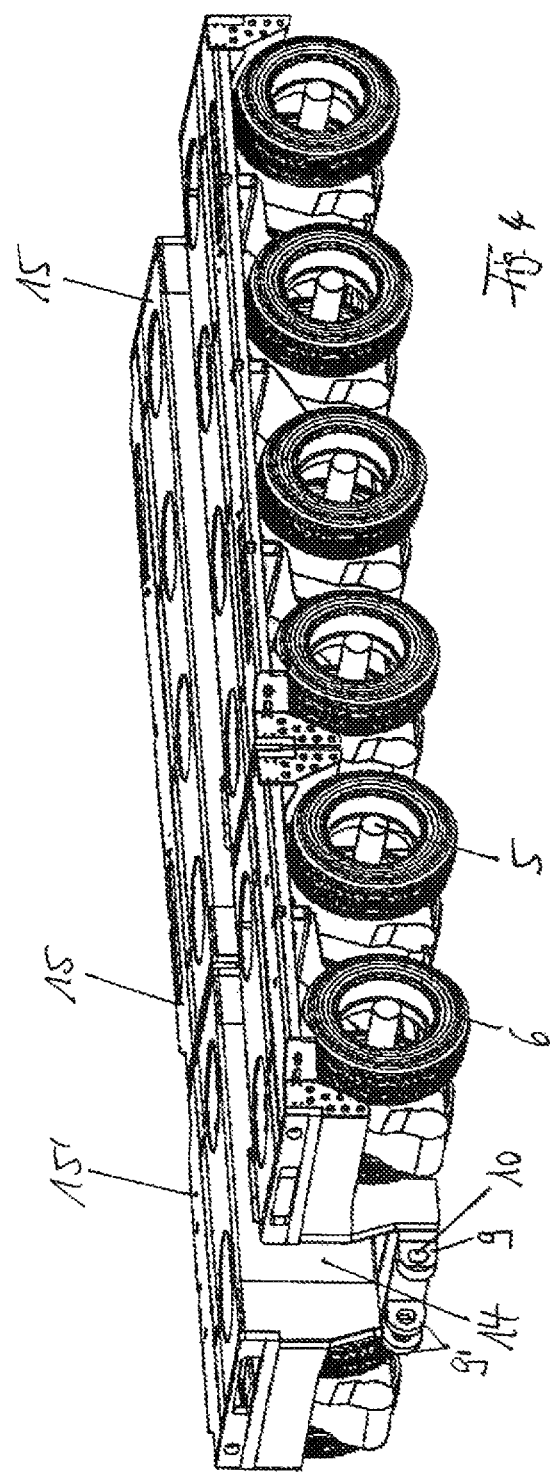
FIG. 4 is a perspective view of a two-axle and four-axle heavy-load modular vehicle, coupled with one another, having U-shaped longitudinal supports.
Figure 5:
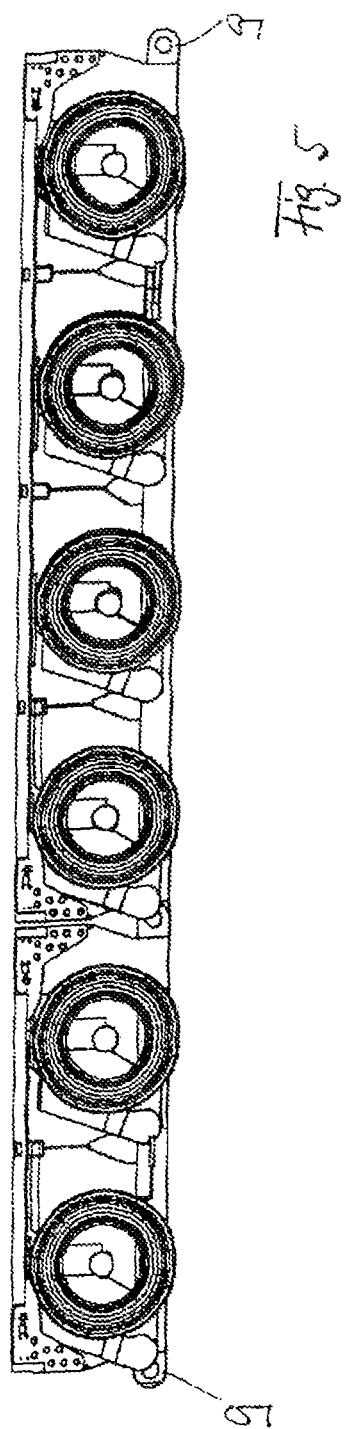
FIG. 5 is a side view of the coupling combination according to FIG. 4.
Figure 6:
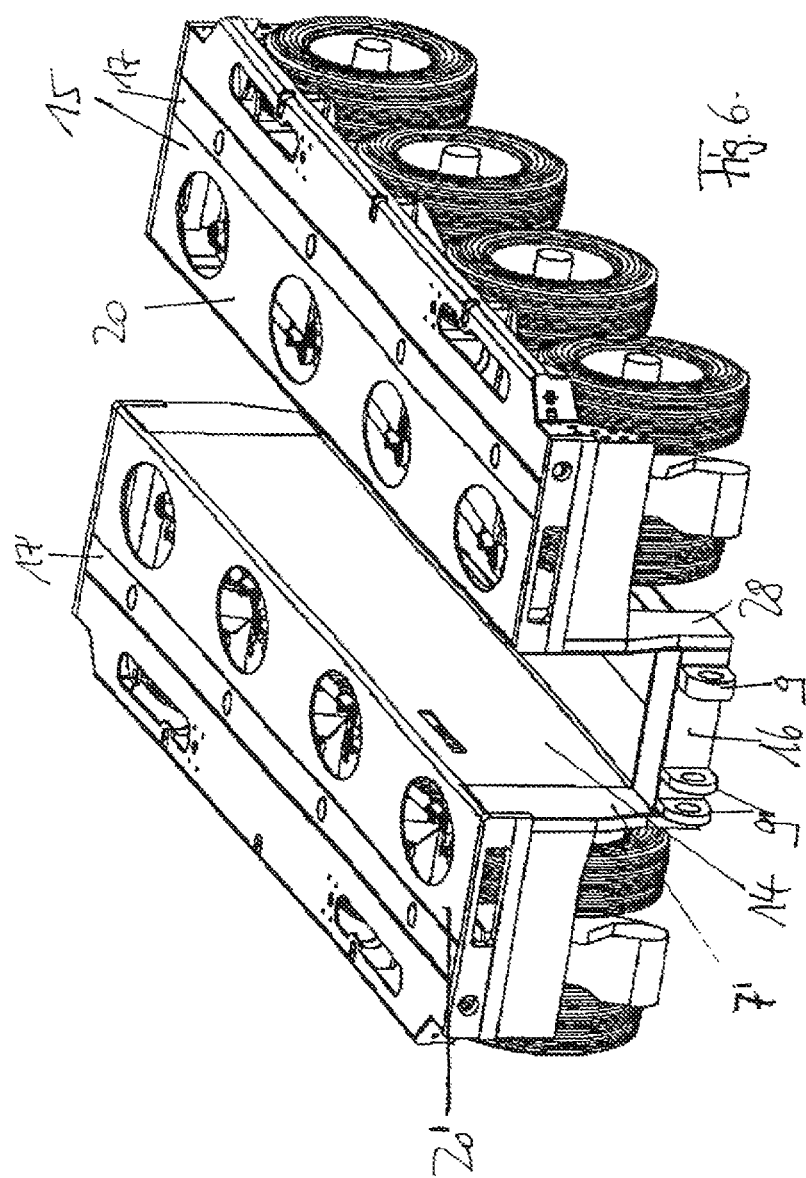
FIG. 6 is a perspective view of a four-axle heavy-load modular vehicle having a U-shaped longitudinal support.
Figure 7:
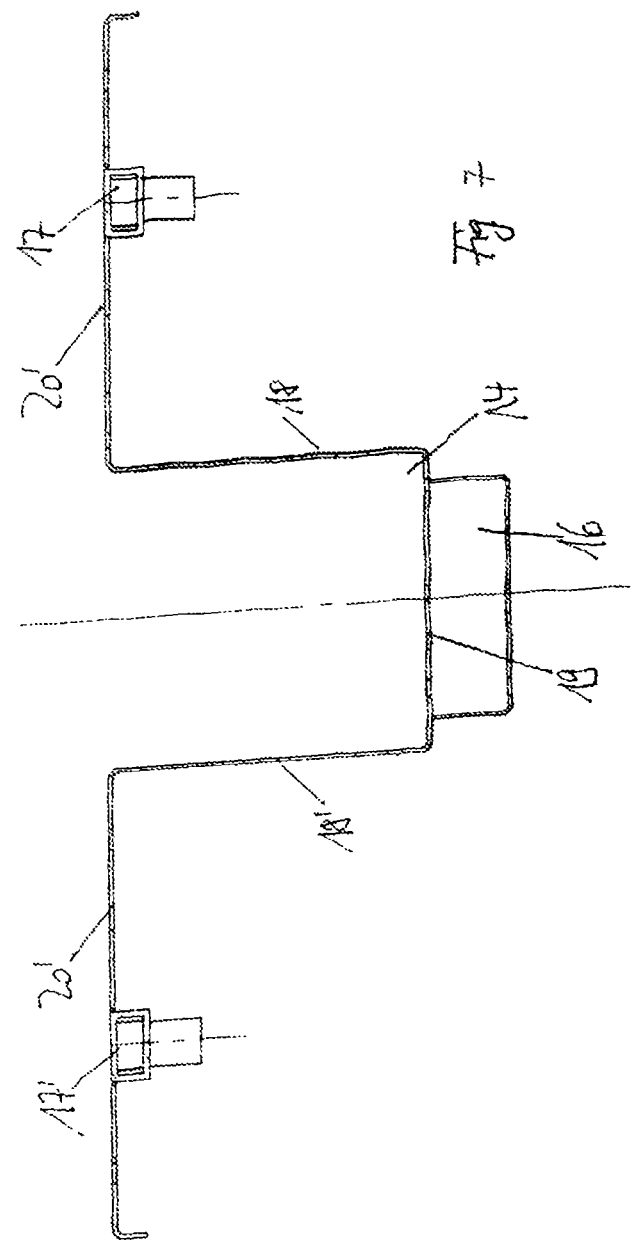
FIG. 7 is a cross-section through a U-shaped longitudinal support having a box-shaped lower belt.

The pull-out support 11 in turn can engage into a central longitudinal support 3 having an open face side 7, of a further heavy-load modular vehicle 1', and, as shown in FIG. 3, can be passed completely through this support and exit on the opposite, free side. It is then fixed in place in this second modular vehicle 1' again, with corresponding bolts, in the desired position. The pull-out support 11 can also engage into the central longitudinal support 3 of a further module, but only to such an extent that it does not exit from this support again on the opposite side, without this feature being shown in any detail in the drawing.

Figure 10:
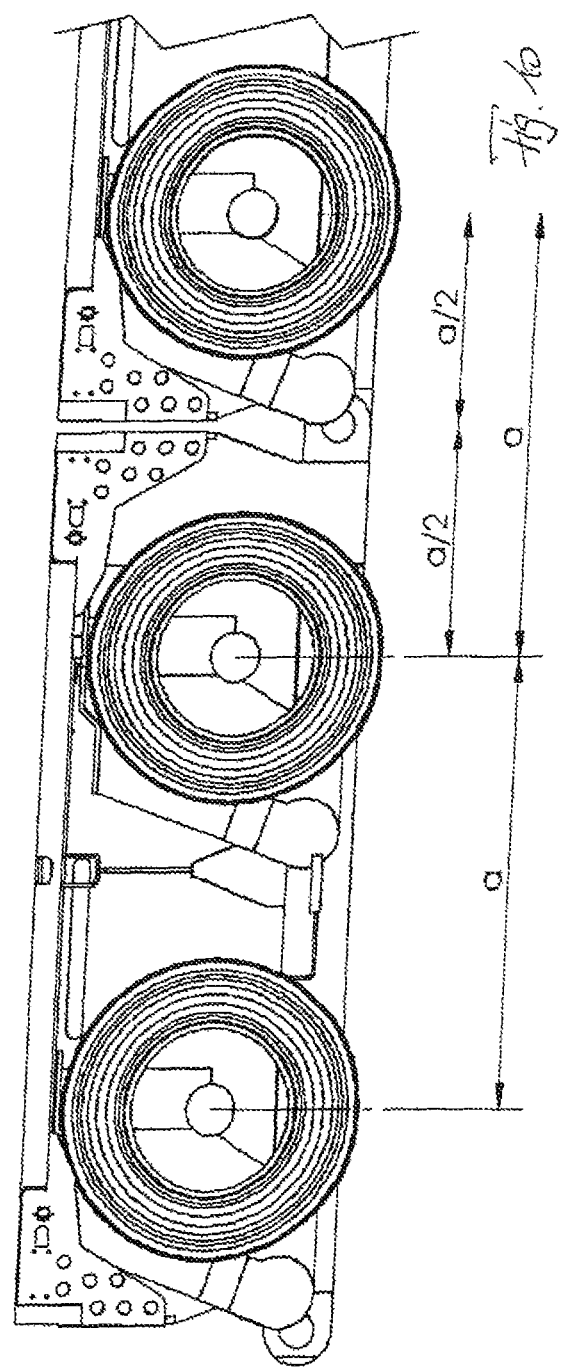
FIG. 10 is a side view of a coupling location and of the overhangs.
Figure 14:
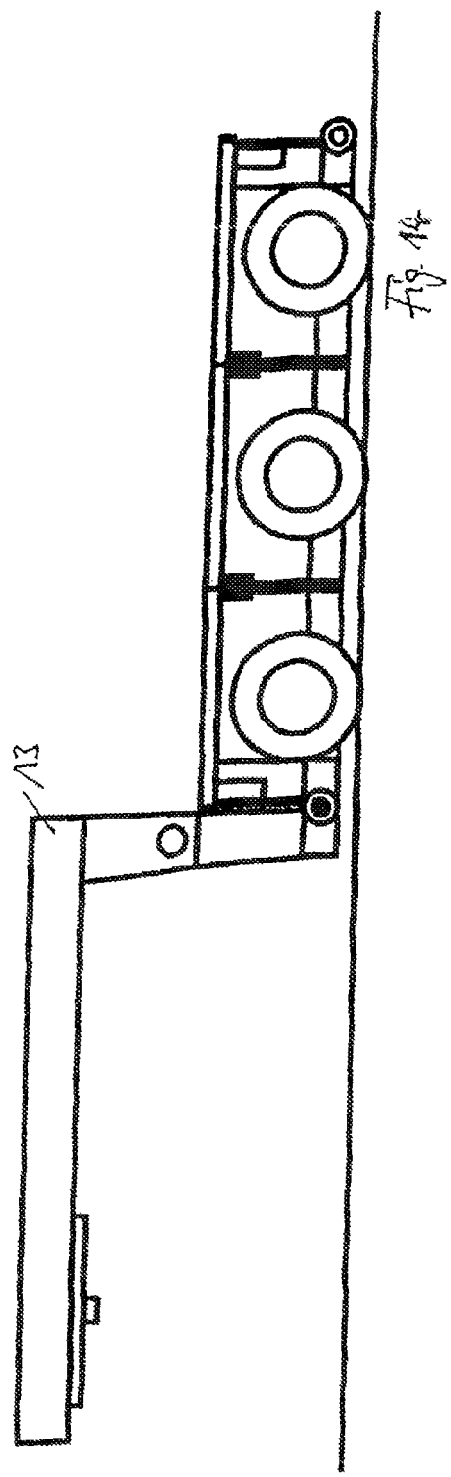
FIG. 14 is a side view of a three-axle heavy-load modular vehicle, with a gooseneck coupled on, FIG. 15 is a side view of a six-axle heavy-load modular vehicle with a tie rod coupled on, FIG. 16 is a side view of a six-axle heavy-load modular vehicle and of a gooseneck connected by means of a pull-out support, partly pulled out.
Figure 15:
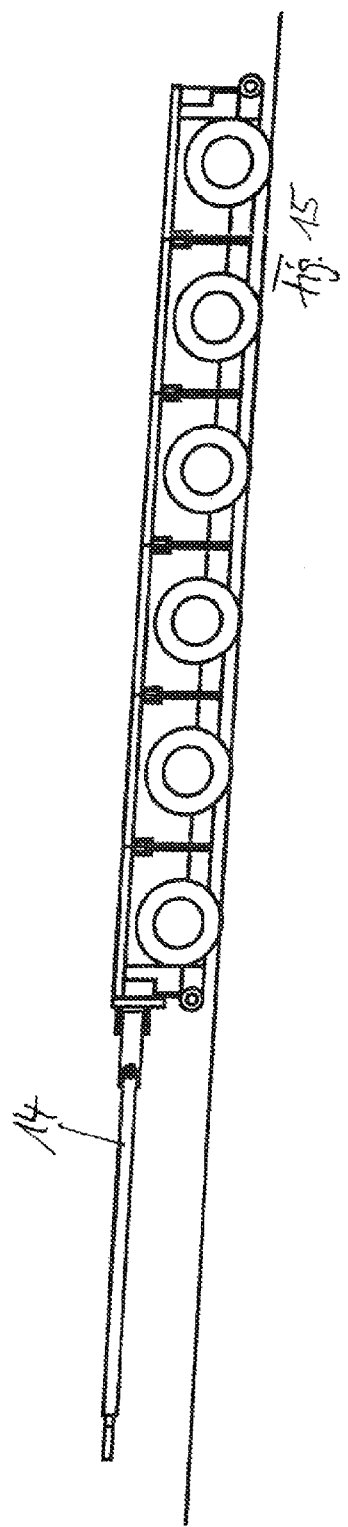
Figure 16:
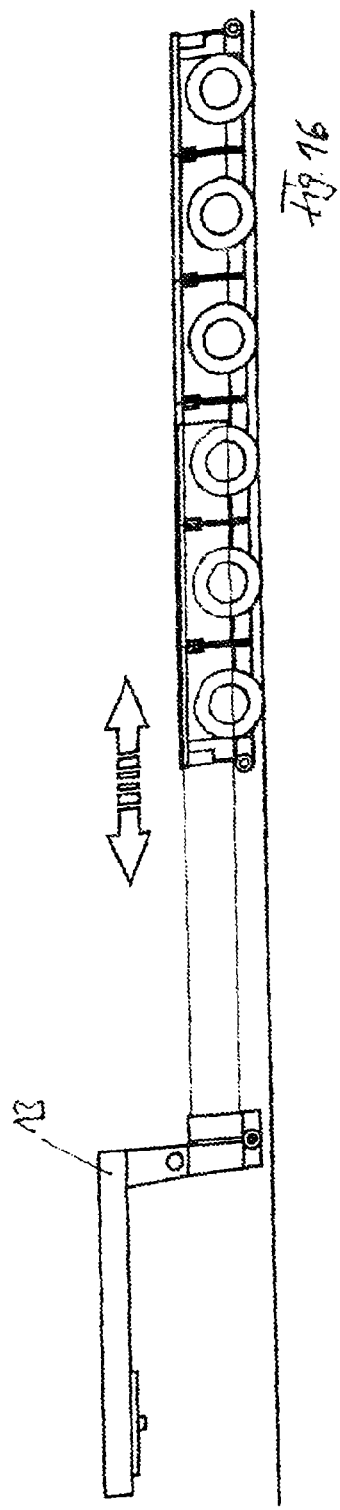
Figure 17:
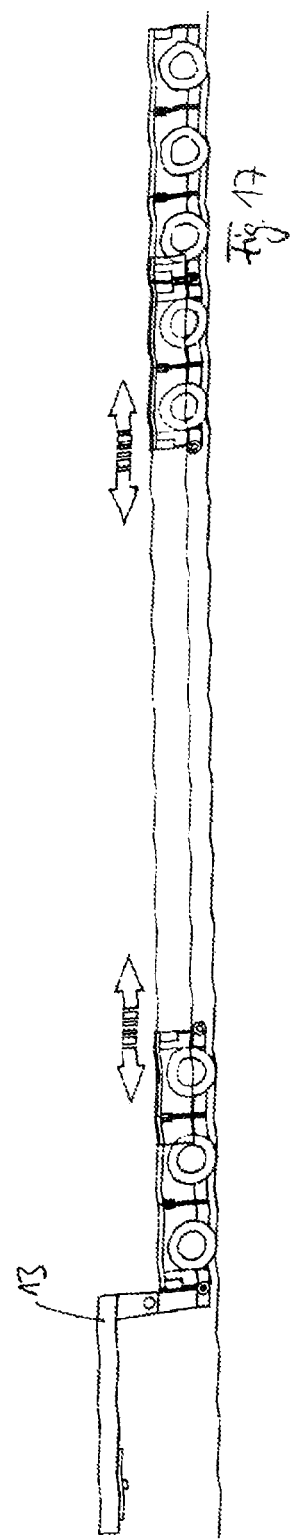
FIG. 17 is a side view of a five-axle and three-axle heavy-load modular vehicle, coupled to a gooseneck by means of a pulled-out pull-out support.
Figure 18:
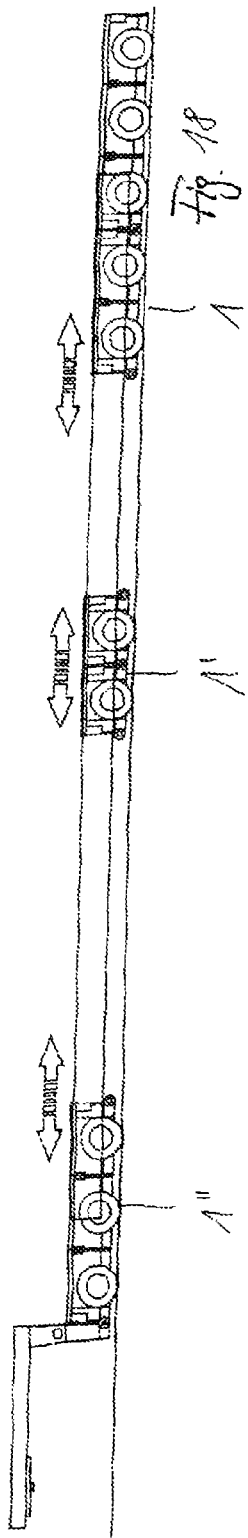
FIG. 18 shows a combination according to FIG. 17, supplemented by a two-axle heavy-load modular vehicle in the middle of the pull-out support.
Figure 19:
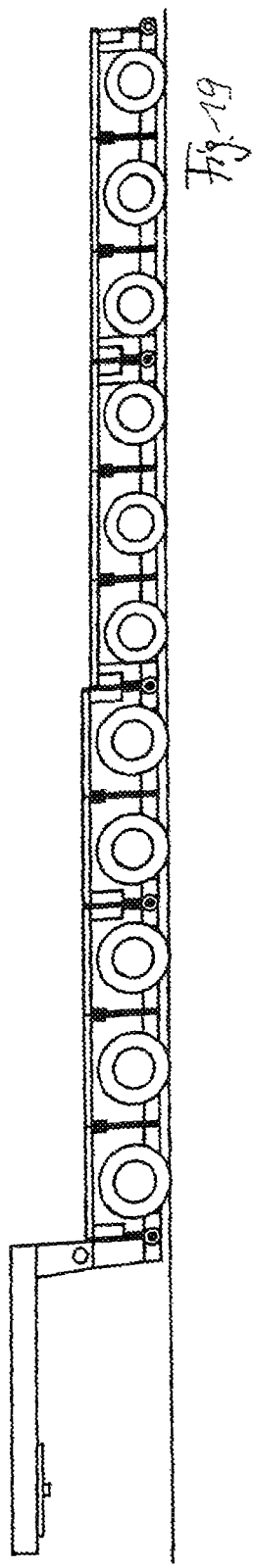
FIG. 19 is a side view of two heavy-load module combinations with different tires, with a gooseneck coupled with it.
Figure 20:
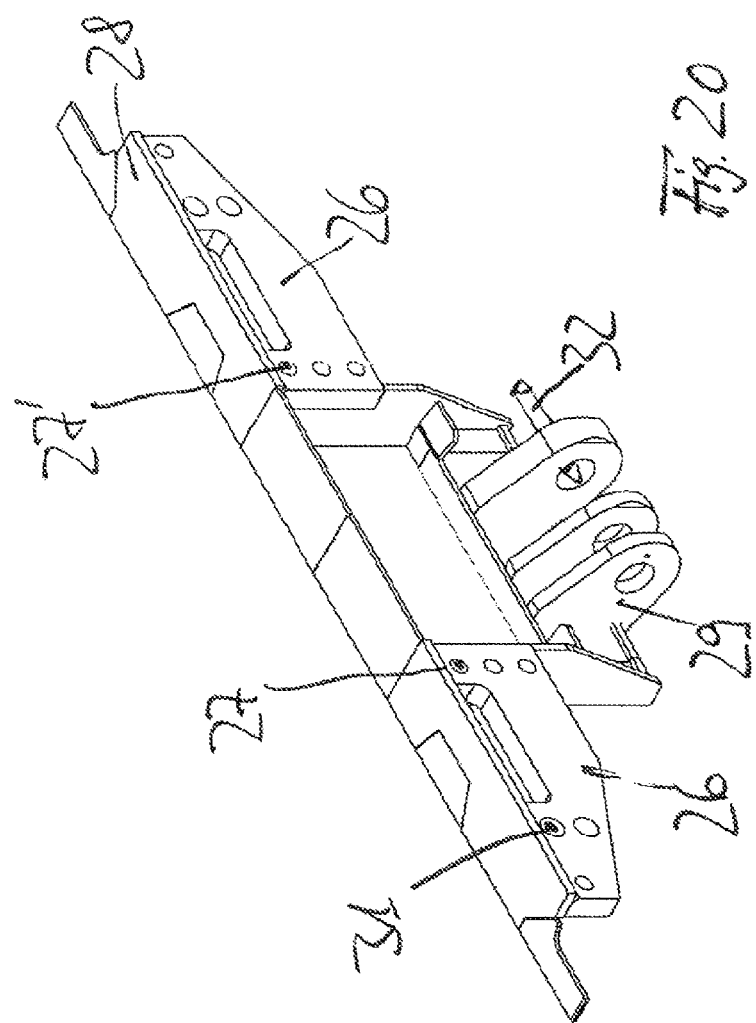
FIG. 20 is a perspective view of a bolt/tab coupling for heavy-load modules having different widths, different heights and/or different tires.
Figure 21:
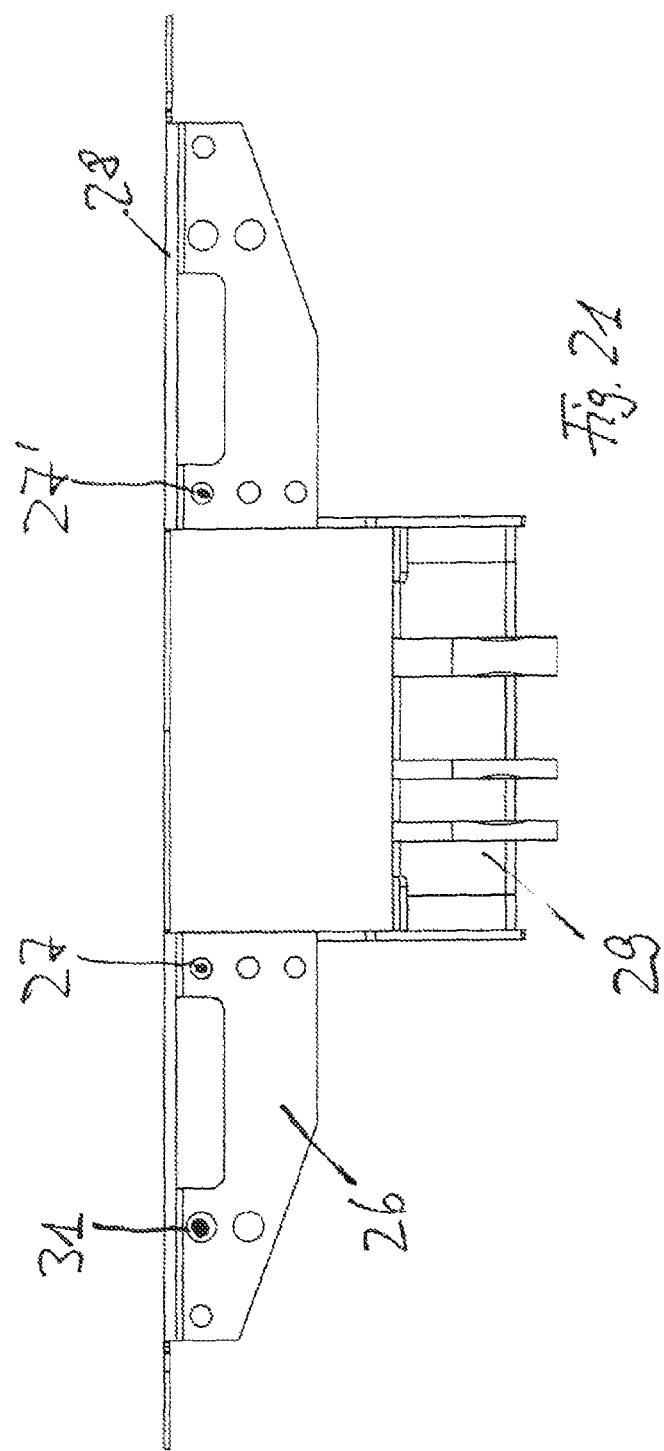
FIG. 21 is a front view of a bolt/tab coupling according to FIG. 20.

As is evident from FIG. 18, for example, a plurality of modular vehicles or modules 1, 1', 1" can be threaded onto the pull-out support 11, for example in such a manner that modules 1, 1" are situated both at the beginning and at the end of the pull-out support 11, in each instance, while a further module 1' is situated in the middle, which module can be moved toward the front or rear and can be fixed in place in the desired position, through which the pull-out support 11 then passes. In such an embodiment, the first module 1", viewed in the direction of travel, is directly connected with a gooseneck 13, as is evident from FIG. 14, for example, or with a drawbar or tow bar 33, for example, see FIG. 15. Alternatively, it is possible to provide the pull-out support 11 itself with coupling means 9, particularly a coupling head, which can be coupled with a gooseneck 13. The individual modules 1, 1', 1" can optionally be equipped with coupling means 9, 9' on both sides. To save material and costs, it is possible to do without this coupling means, particularly at the end of a module, which forms the end of the heavy-load modular vehicle combination, as is evident from FIG. 18. In FIG. 10, it is shown that the overhang of the respective modular vehicle corresponds to half the wheelbase.

Figure 2:
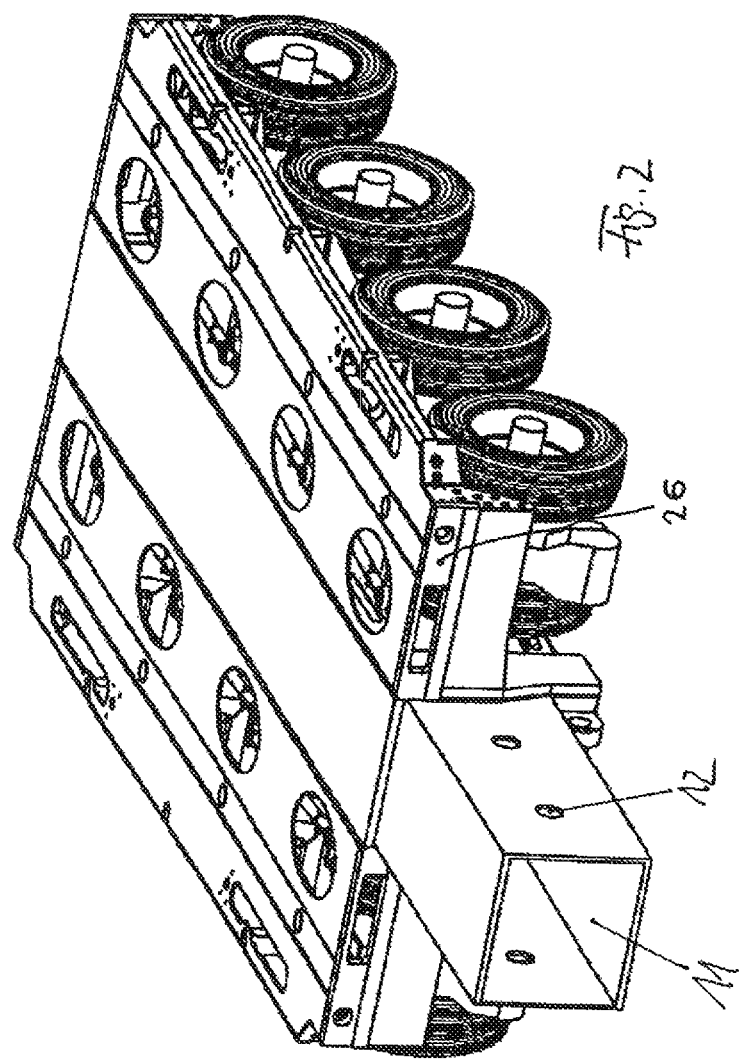
FIG. 2 is a perspective view of a heavy-load modular vehicle according to FIG. 1, with a pull-out support partially pulled out.

Instead of a closed, box-shaped longitudinal support 3, as shown in FIGS. 1 to 3, for example, a U-shaped, central longitudinal support (trough) 14 can also be provided in the individual modular vehicles 15, 15', 15", as is evident, for example, from FIGS. 4 and 6 to 8. These longitudinal supports or troughs also have a box-shaped lower belt 16 with connection means 9, 9' disposed on it, underneath. Crosspieces 18, 18', which are bent away toward the outside of the module or modular vehicle 15 to 15", in each instance, are formed on the lower belt 16, wherein this formation can also be by a continuous, uniform metal sheet bent multiple times, which forms not only the crosspieces 18, 18' but also the base 19 of the U-shaped support 14.

Figure 8:
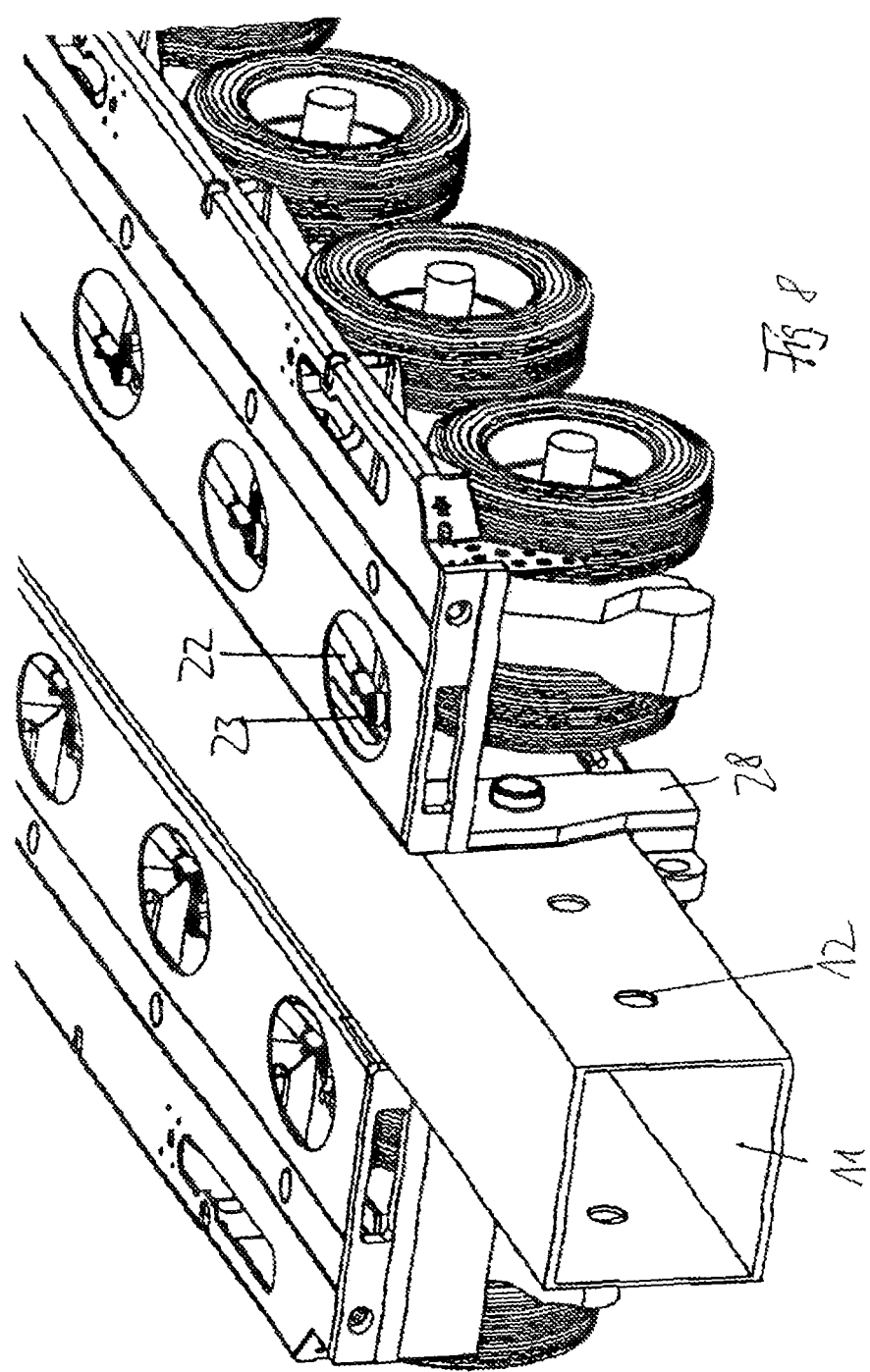
FIG. 8 is a perspective partial view of a heavy-load modular vehicle with a pull-out support partially pulled out.

Recesses 21, 21' can be provided in the loading surface formed by the bent regions 20, 20', which surface can also be provided with reinforcements 17, 17', in order to allow access to the steering mechanisms, particularly to the track rods 22 with track rod heads 23, as shown in FIG. 8.

Figure 11:
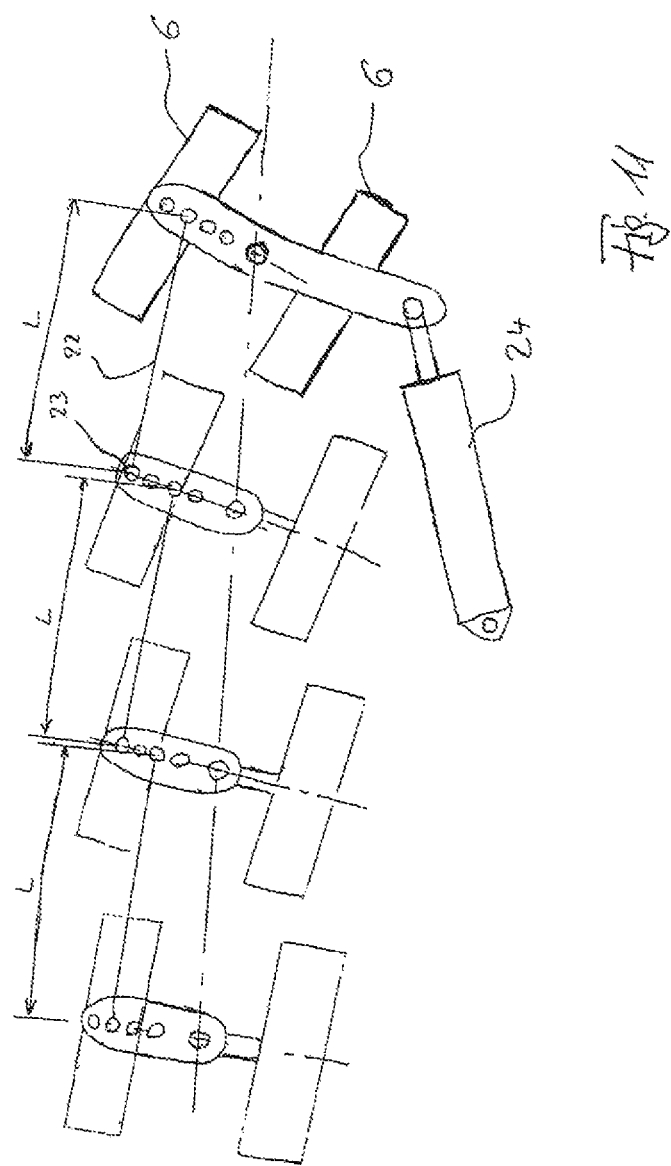
FIG. 11 is a schematic top view of a coupling combination of two heavy-load modular vehicles, with steering means connected by means of track rods, and differently turned twin tires.

As is evident from FIG. 11, only individual axles and steering mechanisms, particularly those items used at the module end, have a slave cylinder 24, with which the corresponding control pressures from a master cylinder of a towing vehicle, not shown in any detail, are converted into the desired steering movements. The other steering mechanisms and steering axles, which are not actively controlled by way of slave cylinders, are steered by way of the track rods 22, which can be repositioned, depending on the vehicle length and vehicle configuration, in such a manner that they are turned not at a maximally possible angle of 60°, for example, but rather in graduated manner, at an angle that decreases toward the center of the modular combination. With this compulsory steering also of the rear axles in the module combination, the required curve travel and tractrix curves are made possible.

Figure 12:
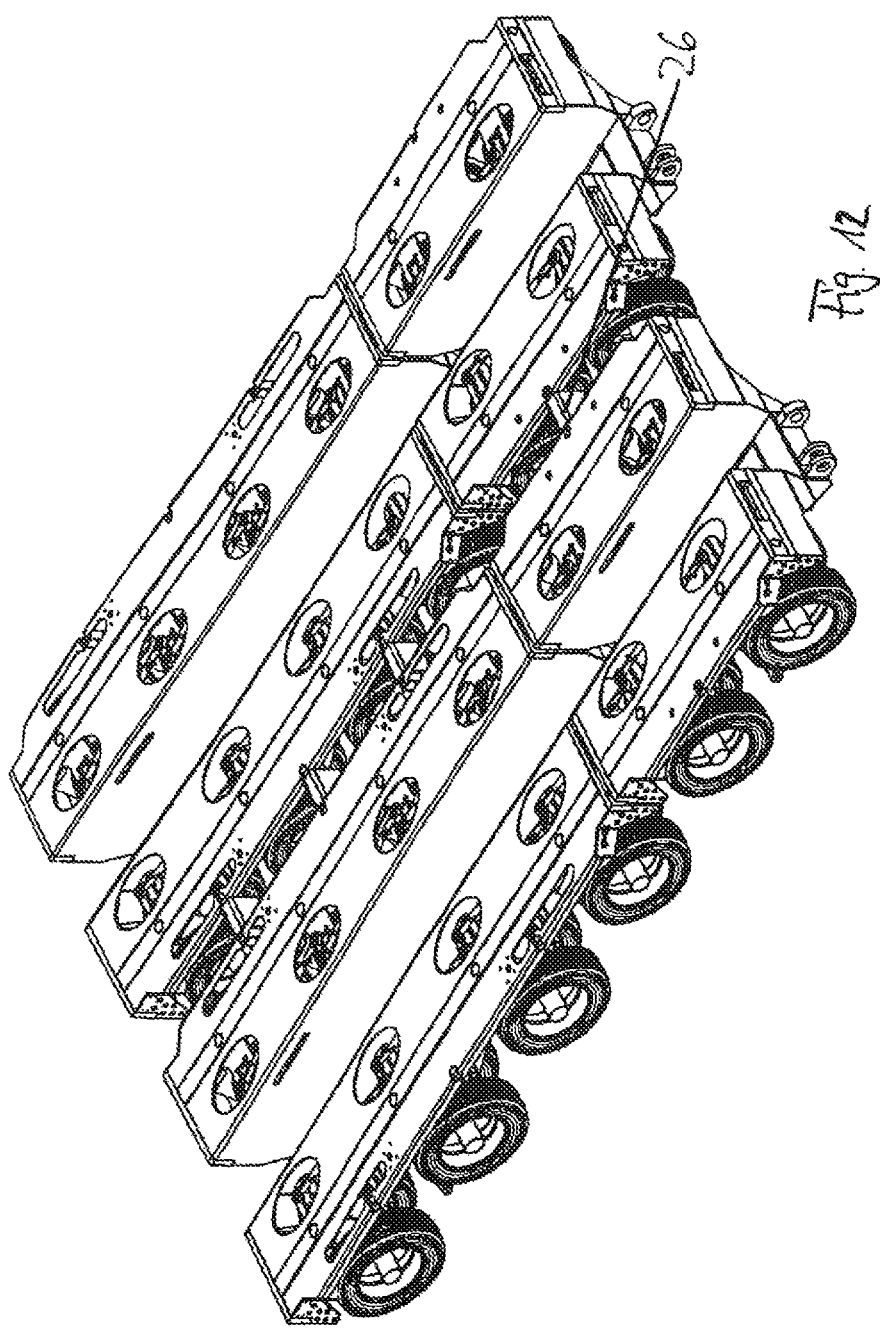
FIG. 12 is a perspective view of a coupling combination with a coupling combination connected with it in the transverse direction.
Figure 13:
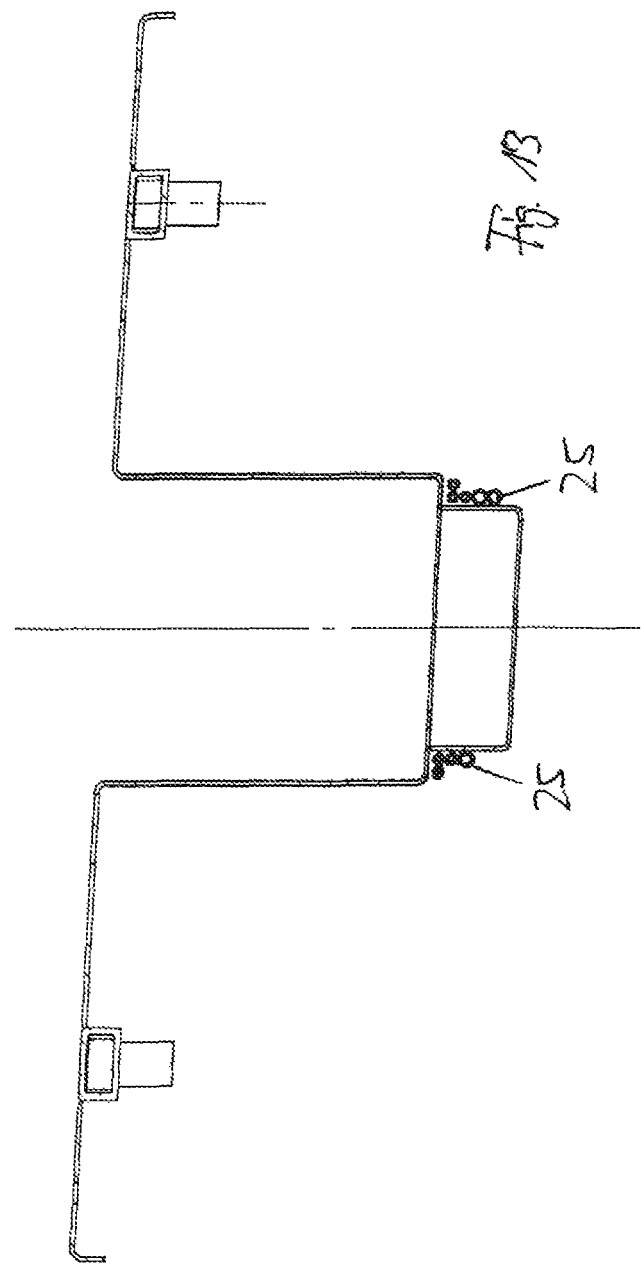
FIG. 13 is a cross-section through a U-shaped frame according to FIG. 7, with supply lines.

The lower belt 8 or 16 disposed underneath the box-shaped longitudinal vehicle support 3 or of the U-shaped longitudinal support 14, respectively, which belt serves as a torsion tube, is structured to be narrower on the underside than at the top, in order to allow simple laying of supply lines 25, see FIG. 13. The individual heavy-load modular vehicles 1, 1', 1", and 15, 15', 15" can be connected with one another not just in the longitudinal direction, but also in the transverse direction, specifically by way of coupling elements, for example spacer pieces or pressure pieces 26, see FIG. 12. Making available a distance between adjacent heavy-load modules 1, 1', 1" or 15, 15', 15" is necessary, because steering parts and tire parts project beyond the outer contours of the modules, particularly their loading surfaces, during curve travel, see FIG. 11.

Of course, the invention is not restricted to the exemplary embodiments shown. Further embodiments are possible, without departing from the basic idea. What is essential is the free ability to combine all the heavy-load modular vehicles in any regard, in order to produce a modular system that can be handled optionally, which system can be combined to form ever new configurations, without having to build or procure a separate special vehicle for every case of use.

For this purpose, it is particularly also provided that the heavy-load modular vehicle 1 has a coupling head, particularly a bolt/tab coupling as coupling means 9, 9', which can be connected with a coupling head, particularly a bolt/tab coupling of a module having different tires, a different width and/or a different height, without an additional adapter. Such a standard interface or such a standard coupling head has pressure pieces 26, braces 28 and/or bores 29, which stand opposite corresponding pressure pieces, metal system sheets and/or bores on the heavy-load modular vehicles to be combined, at least in part. The same tie rods 27, 27', centering bolts 31, and coupling bolts 32 can be used as in the case of modules having the same width, the same tires and/or the same height.

Although only a few embodiments of the present invention have been shown and described, it is to be understood that many changes and modifications may be made thereunto without departing from the spirit and scope of the claims.

What is claimed is:

1. A heavy-load modular vehicle comprising:
   (a) at least one axle;
   (b) at least one steering device;
   (c) first and second coupling devices;
   (d) a central longitudinal support having at least one open face side;
   (e) at least one U-shaped brace on the longitudinal support combined with the first and second coupling devices; and
   (f) a pull-out support guided in the longitudinal support;
   wherein the first coupling device is configured to couple with at least one further heavy-load modular vehicle or further transport apparatus.

2. The heavy-load modular vehicle according to claim 1, wherein the second coupling device is configured to be pulled out.

3. The heavy-load modular vehicle according to claim 1, further comprising a telescoping extension.

4. The heavy-load modular vehicle according to claim 3, wherein the telescoping extension is extendable in multiple steps.

5. The heavy-load modular vehicle according to claim 1, wherein the longitudinal support has a box-shaped lower belt that serves as a torsion tube.

6. The heavy-load modular vehicle according to claim 1, wherein the central longitudinal support comprises a U-shaped longitudinal support having an open top, said longitudinal support forming a longitudinal trough.

7. The heavy-load modular vehicle according to claim 6, wherein the pull-out support is disposed in and configured to be pulled out of the trough.

8. The heavy-load modular vehicle according to claim 1, wherein the first coupling device comprises a coupling head, disposed underneath or outside of the at least one open face side of the longitudinal support.

9. The heavy-load modular vehicle according to claim 8, wherein the coupling head comprises a bolt/tab coupling.

10. The heavy-load modular vehicle according to claim 9, wherein the first coupling device comprises at least one of pressure pieces and tie rods on the longitudinal support.

11. A combination of at least first and second heavy-load modular vehicles, each heavy-load modular vehicle comprising at least one axle, at least one steering device, and first and second coupling devices;
   wherein the first heavy-load modular vehicle is coupled with the second heavy-load modular vehicle via the first coupling device;
   wherein each heavy-load modular vehicle is displaceable and locked in place on a central pull-out support;
   wherein the first heavy-load modular vehicle further comprises a central longitudinal support having at least one open face side; and
   wherein the first heavy-load modular vehicle further comprises at least one U-shaped brace on the longitudinal support combined with the first and second coupling devices and a pull-out support guided in the longitudinal support.

12. The combination according to claim 11, wherein each heavy-load modular vehicle comprises a U-shaped longitudinal support having an open top configured to be set onto the pull-out support and removed from the pull-out support, from below.

13. The combination according to claim 11, wherein the steering device of the first heavy-load modular vehicle is adjustable and combined with the steering device of the second heavy-load modular vehicle.

14. The combination according to claim 11, wherein the first heavy-load modular vehicle has at least one of a different width, different tires, and a different height from the second heavy-load modular vehicle.

15. The combination according to claim 14, wherein the first coupling device of the first heavy-load modular vehicle comprises a first coupling head and the first coupling device of the second heavy-load modular vehicle comprises a second coupling head, and
   wherein the first coupling head is connected to the second coupling head without an adapter.

16. The combination according to claim 14, wherein the first coupling device of each of the first and second heavy-load modular vehicles comprises pressure pieces, metal system sheets, or bores configured for use, at least in part, with ring beams or tie rods, centering bolts and coupling bolts, and
   wherein the pressure pieces, metal system sheets, or bores on the first heavy-load modular vehicle are disposed, at least in part, opposite to the pressure pieces, metal system sheets, or bores on the second heavy-load modular vehicle.

* * * * *